US012511769B2

(12) United States Patent
Chen et al.

(10) Patent No.: US 12,511,769 B2
(45) Date of Patent: Dec. 30, 2025

(54) DISPARITY ESTIMATION METHOD AND APPARATUS, AND IMAGE PROCESSING DEVICE AND STORAGE MEDIUM

(71) Applicant: ZTE CORPORATION, Shenzhen (CN)

(72) Inventors: Dawei Chen, Shenzhen (CN); Shijun Chen, Shenzhen (CN); Dengping Lin, Shenzhen (CN); Junqiang Li, Shenzhen (CN); Juan Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 324 days.

(21) Appl. No.: 18/552,481

(22) PCT Filed: Apr. 21, 2022

(86) PCT No.: PCT/CN2022/088084
§ 371 (c)(1),
(2) Date: Sep. 26, 2023

(87) PCT Pub. No.: WO2022/222983
PCT Pub. Date: Oct. 27, 2022

(65) Prior Publication Data
US 2024/0371019 A1 Nov. 7, 2024

(30) Foreign Application Priority Data
Apr. 23, 2021 (CN) .......................... 202110442253.4

(51) Int. Cl.
*G06T 7/593* (2017.01)
(52) U.S. Cl.
CPC .... *G06T 7/593* (2017.01); *G06T 2207/10012* (2013.01); *G06T 2207/20084* (2013.01)
(58) Field of Classification Search
None
See application file for complete search history.

(56) References Cited

U.S. PATENT DOCUMENTS

| 11,348,270 B2 * | 5/2022 | Jeon ..................... G06N 3/0455 |
| 2016/0063719 A1 * | 3/2016 | Ukil ..................... H04N 13/128 |
| | | 382/103 |

(Continued)

FOREIGN PATENT DOCUMENTS

| CN | 110070574 A | 7/2019 | |
| CN | 111191694 A * | 5/2020 | ............. G06F 18/22 |

(Continued)

OTHER PUBLICATIONS

J. Du, Y. Tang, B. Li, D. Lin and J. Huang, "Improved Disparity Estimation Algorithm Based on PSMNet," 2021 33rd Chinese Control and Decision Conference (CCDC), Kunming, China, 2021, pp. 1157-1163, doi: 10.1109/CCDC52312.2021.9602063.*

(Continued)

*Primary Examiner* — Jiangeng Sun
(74) *Attorney, Agent, or Firm* — Morgan, Lewis & Bockius LLP (57) ABSTRACT

Provided are a disparity estimation method and apparatus, an image processing device, and a storage medium. The method includes: processing input images based on a first network model to obtain a direct cost volume of the input images, where the input images include a first image and a second image, and the first network model includes a convolutional neural network, a pyramid convolutional network, and a spatial pyramid pooling layer; processing the input images based on a second network model to obtain an associated cost volume of the input images, where the second network model includes a residual network; determining an estimated cost of the input images according to the associated cost volume and the direct cost volume; and calculating an estimated disparity corresponding to the first image and the second image according to the estimated cost.

9 Claims, 6 Drawing Sheets

(56) References Cited

U.S. PATENT DOCUMENTS

| | | | | |
|---|---|---|---|---|
| 2019/0295282 | A1* | 9/2019 | Smolyanskiy | G06N 3/0495 |
| 2019/0301861 | A1* | 10/2019 | Wang | G01C 3/14 |
| 2020/0273192 | A1* | 8/2020 | Cheng | G06V 10/454 |
| 2021/0065393 | A1* | 3/2021 | Jeon | G06N 3/0455 |
| 2021/0182675 | A1* | 6/2021 | Wang | G06V 30/274 |
| 2022/0230343 | A1* | 7/2022 | Ye | G06T 7/593 |

FOREIGN PATENT DOCUMENTS

| | | | | |
|---|---|---|---|---|
| CN | 111340922 | A * | 6/2020 | G06N 3/045 |
| CN | 111462212 | A | 7/2020 | |
| CN | 111582437 | A | 8/2020 | |
| CN | 111696148 | A | 9/2020 | |
| CN | 112150521 | A | 12/2020 | |
| EP | 3355272 | A1 * | 8/2018 | G06N 3/045 |

OTHER PUBLICATIONS

L. Yang, J. Zhang and Y. Yang, "A feature extraction technique in stereo matching network," 2019 IEEE 4th Advanced Information Technology, Electronic and Automation Control Conference (IAEAC), Chengdu, China, 2019, pp. 393-396, doi: 10.1109/IAEAC47372.2019.8998024.*

Extended European Search Report in Application No. 22791089.0, dated Apr. 1, 2025, 8 pages.

Pang et al., "Cascade Residual Learning: A Two-stage Convolutional Neural Network for Stereo Matching", 2017 IEEE International Conference on Computer Vision Workshops (ICCVW), IEEE, Oct. 22, 2017, pp. 878-886, XP033303533, DOI: 10.1109/ICCVW.2017.108.

Jia et al., "Bidirectional Stereo Matching Network With Double Cost Volumes", IEEE Access, IEEE, USA, vol. 9, Jan. 11, 2021, pp. 19651-19658, XP011834105, DOI: 10.1109/ACCESS.2021.3050540.

Chang et al., "Pyramid Stereo Matching Network", 2018 IEEE/CVF Conference on Computer Vision and Pattern Recognition, IEEE, Jun. 18, 2018, pp. 5410-5418, XP033473454, DOI: 10.1109/CVPR.2018.00567.

Wu et al., "Semantic Stereo Matching With Pyramid Cost Volumes", 2019 IEEE/CVF International Conference on Computer Vision (ICCV), IEEE, Oct. 27, 2019, pp. 7483-7492, XP033723842, DOI: 10.1109/ICCV.2019.00758.

International Search Report in Application No. PCT/CN2022/088084, dated Apr. 21, 2022, 5 pages, including translation.

Lu, Zhimin et al., "A Stereo Matching Algorithm Based on Convolutional Neural Network", Information on Technology and Network Security, vol. 39, No. 5, May 31, 2020, pp. 1-5.

* cited by examiner

DISPARITY ESTIMATION METHOD AND APPARATUS, AND IMAGE PROCESSING DEVICE AND STORAGE MEDIUM

CROSS REFERENCE TO RELATED APPLICATIONS

This is a National Stage Application filed under 35 U.S.C. 371 based on International Patent Application No. PCT/CN2022/088084, filed on Apr. 21, 2022, which claims priority to Chinese Patent Application No. 202110442253.4 filed on Apr. 23, 2021, the disclosures of both are incorporated herein by reference in their entireties.

TECHNICAL FIELD

The present application relates to the field of image processing technology, for example, a disparity estimation method and apparatus, an image processing device, and a storage medium.

BACKGROUND

Stereo matching is a critical technical link for autonomous driving, three-dimensional (3D) model reconstruction, object detection and recognition, and other computer vision tasks. The purpose of stereo matching is to estimate a depth by matching pixels in a pair of correction images captured by two cameras, and the core of stereo matching is disparity estimation. A deep convolutional neural network (CNN) can transform the disparity estimation into an end-to-end supervised learning task, omitting an unnecessary processing process and improving the efficiency of stereo matching.

Presently, most neural networks used for disparity estimation use a relatively small convolution kernel and a downsampling layer to enlarge receptive fields of the networks. However, an actual receptive field is much smaller than a theoretical receptive field of the method, and enough context information and a dependency relationship between features in different scenarios cannot be obtained. Most convolutional neural networks used for disparity estimation tend to lose a lot of associated information, affecting disparity estimation accuracy and thus affecting matching accuracy.

SUMMARY

The present application provides a disparity estimation method and apparatus, an image processing device, and a storage medium, so as to consider an association between features on different scales and at different levels and improve the accuracy of disparity estimation and stereo matching.

An embodiment of the present application provides a disparity estimation method. The method includes the operations below.

Input images is processed based on a first network model so that a direct cost volume of the input images is obtained, where the input images include a first image and a second image, and the first network model includes a convolutional neural network, a pyramid convolutional (PyConv) network, and a spatial pyramid pooling (SPP) layer.

The input images are processed based on a second network model so that an associated cost volume of the input images is obtained, where the second network model includes a residual network.

An estimated cost of the input images is determined according to the associated cost volume and the direct cost volume.

An estimated disparity corresponding to the first image and the second image is calculated according to the estimated cost.

An embodiment of the present application further provides a disparity estimation apparatus. The apparatus includes a first volume calculation module, a second volume calculation module, a cost estimation module, and a disparity estimation module.

The first volume calculation module is configured to process input images based on a first network model to obtain a direct cost volume of the input images, where the input images include a first image and a second image, and the first network model includes a convolutional neural network, a pyramid convolutional network, and a spatial pyramid pooling layer.

The second volume calculation module is configured to process the input images based on a second network model to obtain an associated cost volume of the input images, where the second network model includes a residual network.

The cost estimation module is configured to determine an estimated cost of the input images according to the associated cost volume and the direct cost volume.

The disparity estimation module is configured to calculate a disparity corresponding to the first image and the second image according to the estimated cost.

An embodiment of the present application further provides an image processing device. The image processing device includes a memory, a processor, and a computer program stored on the memory and executable by the processor, where the processor, when executing the program, performs the preceding disparity estimation method.

An embodiment of the present application further provides a computer-readable storage medium. The computer-readable storage medium stores a computer program which, when executed by a processor, causes the processor to perform the preceding disparity estimation method.

DETAILED DESCRIPTION

The present application is described hereinafter in conjunction with the drawings and embodiments. It is to be understood that the embodiments described herein are intended to explain the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

Figure 1:
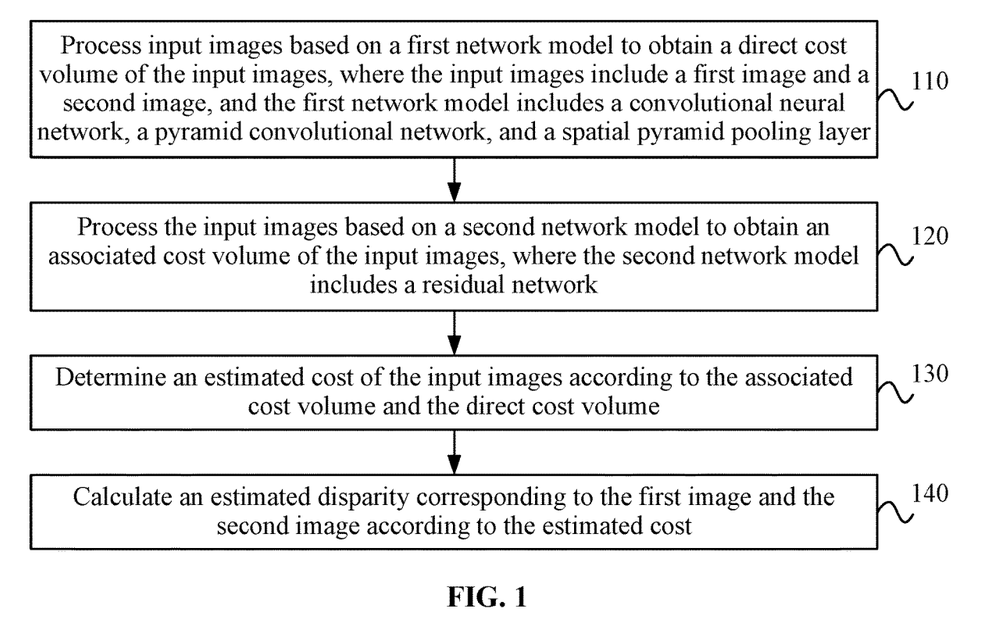
FIG. 1 is a flowchart of a disparity estimation method according to an embodiment.

An embodiment of the present application provides a disparity estimation method. FIG. 1 is a flowchart of a disparity estimation method according to an embodiment. As shown in FIG. 1, the method provided in this embodiment includes operations 110 to 140.

In operation 110, input images is processed based on a first network model so that a direct cost volume of the input images is obtained, where the input images include a first image and a second image, and the first network model includes a convolutional neural network, a pyramid convolutional network, and a spatial pyramid pooling layer.

In this embodiment, the input images include two images acquired by image sensors at different positions, which are denoted as the first image and the second image separately. For example, the input images may be a left image and a right image in binocular stereo vision. The first network model is used for extracting multi-scale features of two input images, so as to calculate the direct cost volume of the two input images. The first network model includes the CNN, the pyramid convolutional (PyConv) network, and the spatial pyramid pooling (SPP) layer. The CNN is used for extracting features of the first image and features of the second image separately; the PyConv is used for performing a convolution operation on the features of the first image and the features of the second image separately to obtain respective multi-scale features of the first image and the second image; and the SPP is used for aggregating the respective multi-scale features of the first image and the second image to obtain matching costs of the first image and matching costs of the second image, and matching costs of the two input images are spliced so that the direct cost volume of the input images can be obtained. Convolution kernels on different scales are integrated by using the pyramid convolutional network so that the performance of multiple visual tasks can be improved. In operation 120, the input images are processed based on a second network model so that an associated cost volume of the input images is obtained, where the second network model includes a residual network.

In this embodiment, the second network model is used for extracting underlying features of the two input images, so as to calculate the associated cost volume of the two input images. The second network model includes the residual network, the residual network extracts respective underlying features of the first image and the second image to obtain underlying feature matching costs of the first image and underlying feature matching costs of the second image separately, and underlying feature matching costs of the two input images are spliced so that the associated cost volume of the input images can be obtained.

It is to be noted that operation 110 and operation 120 may generally be performed in parallel without distinguishing their order. In operation 130, an estimated cost of the input images is determined according to the associated cost volume and the direct cost volume.

In this embodiment, the estimated cost of the input images is used for measuring a correlation between pixels to be matched and candidate pixels in the first image and the second image. The smaller an estimated cost of two pixels, the greater a correlation between the two pixels and the greater the probability that the two pixels are homonymy points. In this embodiment, the estimated cost of the two input images is determined according to a combination of the associated cost volume and the direct cost volume of the two input images. For example, an average of the associated cost volume and the direct cost volume is used as an overall cost volume of the input images, and the cost volume is aggregated so that the estimated cost is obtained. A process of determining the estimated cost may be understood as a process of performing cost aggregation on the associated cost volume and the direct cost volume.

In operation 140, an estimated disparity corresponding to the first image and the second image is calculated according to the estimated cost.

In this embodiment, a process of calculating the estimated disparity may be understood as a process of disparity regression, the estimated cost is essentially a matrix composed of cost values, and an optimal disparity of each pixel may be determined according to the matrix. Generally, a disparity corresponding to a minimum cost value among cost values of a certain pixel under all disparities is selected as an optimal disparity. In this embodiment, the estimated cost is determined according to the combination of the associated cost volume and the direct cost volume of the two input images so that the correlation between pixels can be accurately reflected, and an accurate estimated disparity can be obtained on this basis, thereby improving the accuracy of stereo matching.

Figure 2:
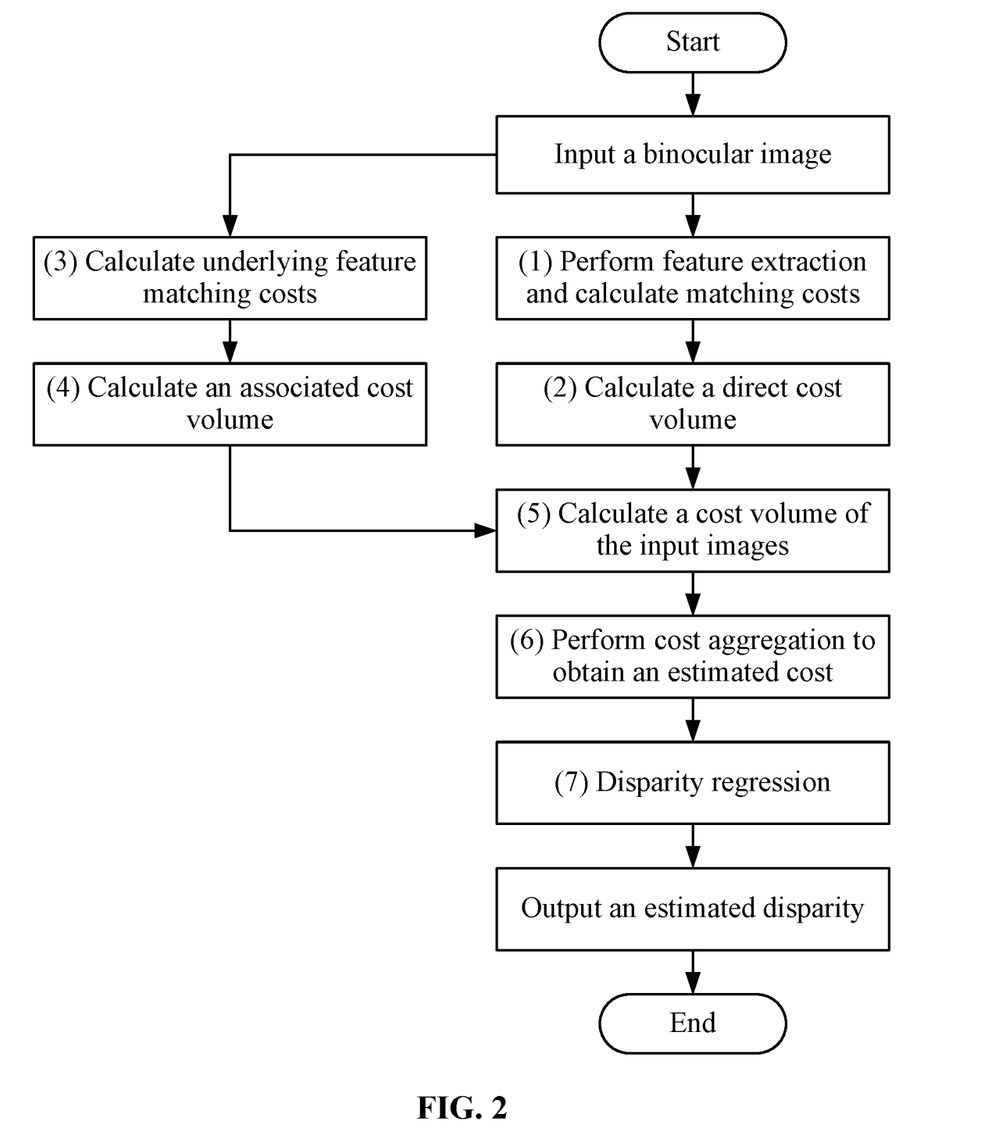
FIG. 2 is a schematic diagram of a disparity estimation process according to an embodiment.

FIG. 2 is a schematic diagram of a disparity estimation process according to an embodiment. The disparity estimation method in this embodiment is applicable to the scenario of stereo matching in the binocular stereo vision. As shown in FIG. 2, a binocular image refers to the first image and the second image, and the two input images are processed by the first network model and the second network model separately so that the direct cost volume and the associated cost volume are obtained separately.

In operation (1), the multi-scale features of the first image and the second image are extracted for calculating the matching costs. This operation may be performed by the first network model.

In operation (2), the matching costs of the first image and the matching costs of the second image are spliced so that the direct cost volume (essentially a matrix composed of matching cost values) is obtained.

In operation (3), the underlying features of the first image and the second image are extracted for calculating the underlying feature matching costs. This operation may be performed by the second network model.

In operation (4), associated matching costs are spliced so that the associated cost volume (essentially a matrix composed of underlying feature matching cost values) is obtained. It is to be noted that in this operation, the underlying feature matching costs may be grouped, and the underlying feature matching costs are converted into associated cost values in units of groups, so as to fully consider an association between pixels and reflect a global feature.

In operation (5), the overall cost volume of the binocular image is determined according to the combination of the direct cost volume and the associated cost volume.

Operation (6) is a process of cost aggregation, that is, the final estimated cost is determined according to the cost volume of the binocular image.

Operation (7) is the process of disparity regression, that is, an optimal disparity value of each pixel is determined according to the estimated cost.

According to the disparity estimation method in this embodiment, the pyramid convolutional network is introduced in the process of calculating the matching costs so that richer features can be extracted and feature details on different scales can be obtained; moreover, the estimated cost is determined in conjunction with the associated cost volume constructed according to the underlying features so that the features are fully reused, and the association between pixels is considered, thereby improving the accuracy and performance of disparity estimation and stereo matching.

In an embodiment, operation 110 includes operations 1110 to 1140.

In operation 1110, feature information of the first image and feature information of the second image are extracted separately based on the convolutional neural network.

In operation 1120, a convolution operation is performed on the feature information of the first image and the feature information of the second image separately based on the pyramid convolutional network so that multi-scale feature information of the first image and multi-scale feature information of the second image are obtained.

In operation 1130, the multi-scale feature information of the first image and the multi-scale feature information of the second image are aggregated separately based on the spatial pyramid pooling layer so that matching costs of the first image and matching costs of the second image are obtained.

In operation 1140, the matching costs of the first image and the matching costs of the second image are spliced so that the direct cost volume of the input images is obtained.

In this embodiment, the features of the first image and the features of the second image are extracted separately based on the convolutional neural network sharing weights, where the feature information of the first image is denoted as $F_l$, and the feature information of the second image is denoted as $F_r$; $F_l$ and $F_r$ pass through the pyramid convolutional network whose convolution kernels may be set to [3, 5, 7, 9] so that the multi-scale feature information is obtained; the multi-scale feature information is aggregated by using the spatial pyramid pooling layer; finally, all the multi-scale feature information of the first image is spliced and used as the matching costs $C_l$ of the first image, and all the multi-scale feature information of the second image is spliced and used as the matching costs $C_r$ of the second image; on this basis, $C_l$ and $C_r$ at the same disparity level are spliced so that the direct cost volume is obtained.

Figure 3:
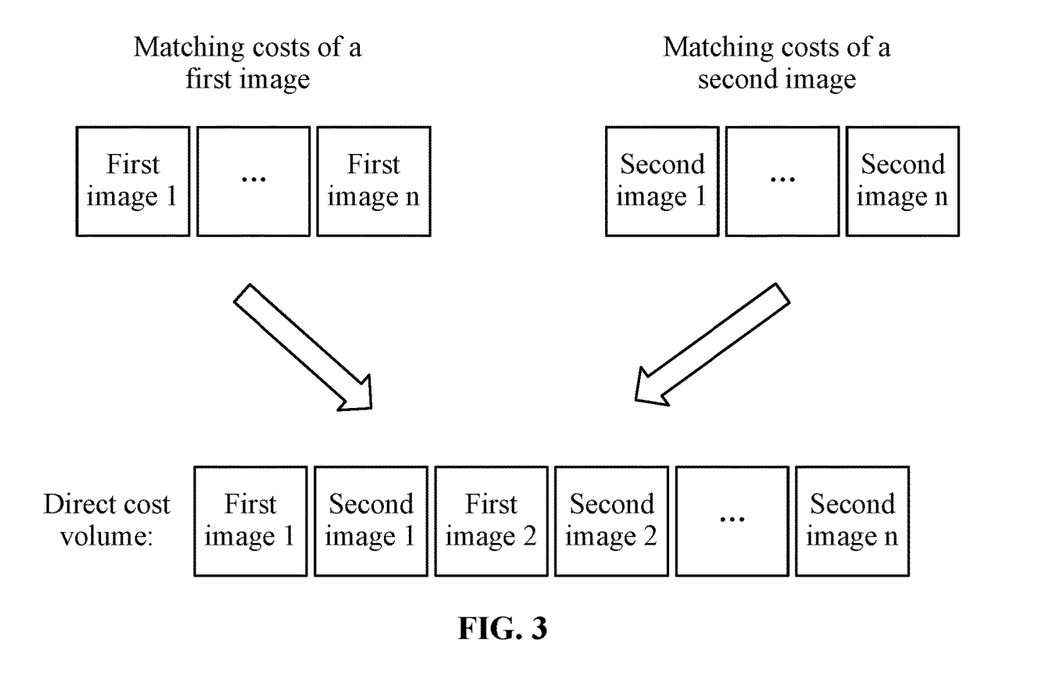
FIG. 3 is a schematic diagram illustrating that a direct cost volume is calculated according to an embodiment.

FIG. 3 is a schematic diagram illustrating that a direct cost volume is calculated according to an embodiment. As shown in FIG. 3, the feature information of the first image under n disparities is spliced so that the matching costs $C_l$ of the first image are obtained, and the feature information of the second image under the n disparities is spliced so that the matching costs $C_r$ of the second image are obtained; and matching costs at the same disparity level are spliced so that the direct cost volume is obtained.

In an embodiment, operation 120 includes operations 1210 to 1240.

In operation 1210, the underlying feature matching costs of the first image and the underlying feature matching costs of the second image are acquired separately based on the residual network.

In operation 1220, the underlying feature matching costs of the first image and the underlying feature matching costs of the second image are grouped separately so that at least one associated cost information group is obtained, where each of the at least one associated cost information group includes at least one underlying feature matching cost.

In operation 1230, the at least one underlying feature matching cost in the each of the at least one associated cost information group is updated.

In operation 1240, updated underlying feature matching costs of the first image and updated underlying feature matching costs of the second image are spliced so that an associated cost volume is obtained.

The above grouping, updating, and splicing operations (that is, operations 1220 to 1240) are repeated for a preset number of times, and the obtained associated cost volume is used as the associated cost volume of the input images.

In this embodiment, the underlying features of the first image and the underlying features of the second image are extracted separately based on the residual network sharing weights so that the underlying feature matching costs of the first image and the underlying feature matching costs of the second image are obtained. For example, the residual network is a shallow residual network with a convolution kernel of 3×3. Since the residual network has relatively few network layers, underlying feature information of the input images can be retained relatively completely. On this basis, the associated cost volume is calculated by using the underlying feature matching costs, including the operations below.

The underlying feature matching costs of the first image and the underlying feature matching costs of the second image are grouped separately, and the underlying feature matching cost in each associated cost information group is updated in units of groups, that is, the underlying feature matching cost in each associated cost information group is converted into an associated cost value, and a matrix composed of associated cost values and obtained after a preset number of iterations is the associated cost volume.

Figure 4:
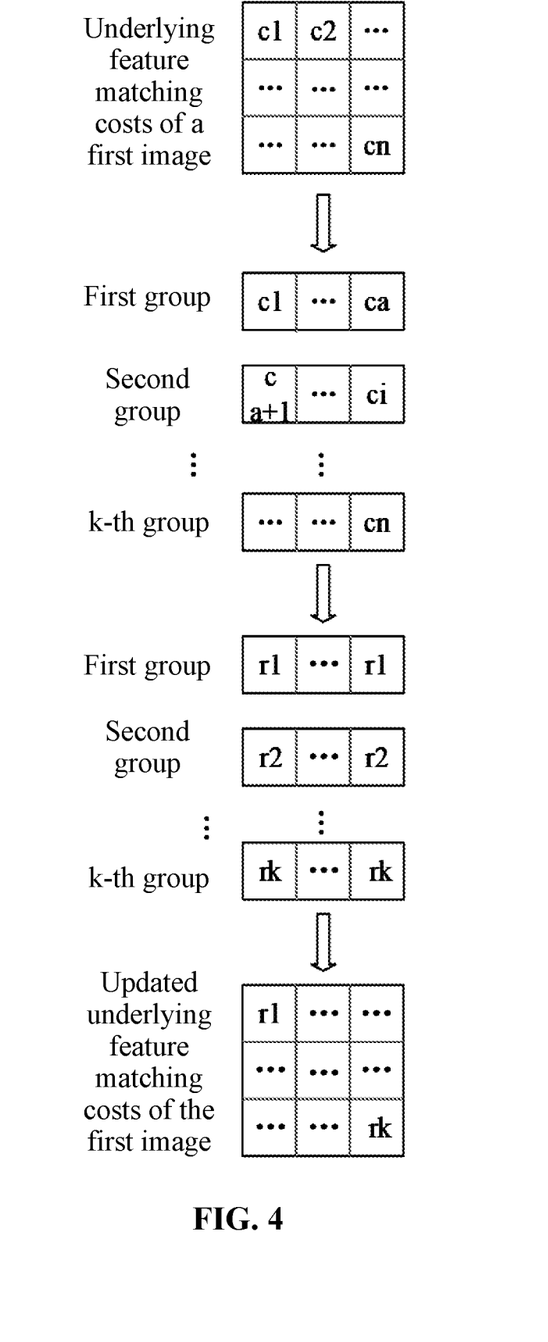
FIG. 4 is a schematic diagram illustrating that underlying feature matching costs are updated according to an embodiment.

FIG. 4 is a schematic diagram illustrating that underlying feature matching costs are updated according to an embodiment. A processing process of the first image is used as an example. The underlying feature matching costs of the first image obtained by the residual network is expressed as c1, c2, . . . , cn and divided into k associated cost information groups, the first associated cost information group includes c1, c2, . . . , ca, and underlying feature matching costs in the associated cost information group are all updated to an associated cost value r1; the second associated cost information group includes ca+1, ca+2, . . . , ci, and underlying feature matching costs in the associated cost information group are all updated to an associated cost value r2, and in the same manner, underlying feature matching costs in the k-th associated cost information group are all updated to an associated cost value rk. Similarly, the above operations are performed on the second image so that the updated underlying feature matching costs of the second image are obtained. The updated underlying feature matching costs of the first image and the updated underlying feature matching costs of the second image are spliced so that the associated cost volume of the two input images is obtained.

In an embodiment, operation 1230 includes the operations below.

An average of the at least one underlying feature matching cost in the each of the at least one associated cost information group is calculated.

Each of the at least one underlying feature matching cost in the each of the at least one associated cost information group is replaced with the average of the at least one underlying feature matching cost in the each of the at least one associated cost information group.

In this embodiment, the average of the underlying feature matching cost in each associated cost information group is calculated so that the underlying feature matching cost in each associated cost information group is updated. Referring to FIG. 3, the first associated cost information group includes a underlying feature matching cost values, and an average of these underlying feature matching cost values is $$r1 = \frac{\sum_{i=1}^{a} ci}{a}.$$

Thus, the underlying feature matching cost values in the first associated cost information group are all updated to r1. Similarly, the average of the underlying feature matching costs in each associated cost information group may be extended to the underlying feature matching costs in the corresponding associated cost information group so that the number of underlying feature matching cost values remains unchanged, and the updated underlying feature matching costs of the first image and the updated underlying feature matching costs of the second image are obtained. Finally, updated underlying feature matching costs at the same disparity level are spliced so that the associated cost volume of the two input images is obtained.

Figure 5:
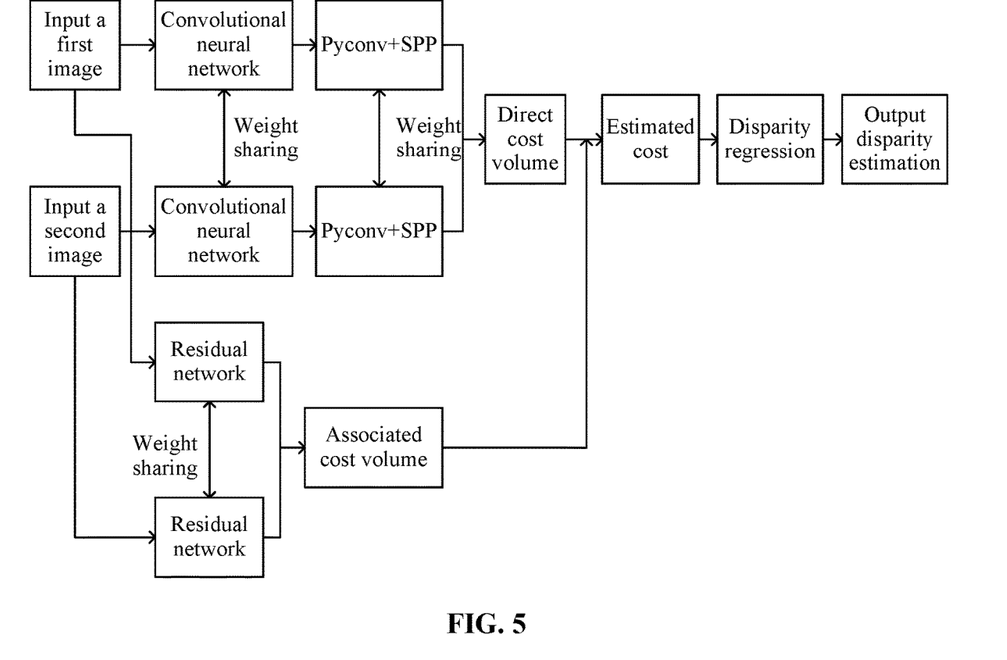
FIG. 5 is a schematic diagram of a disparity estimation process according to another embodiment.

FIG. 5 is a schematic diagram of a disparity estimation process according to another embodiment. As shown in FIG. 5, the first image and the second image are separately inputted into the CNN, the PyConv, and the SPP sharing weights so that the direct cost volume is obtained; at the same time, the first image and the second image are separately inputted into the residual network sharing weights so that the associated cost volume is obtained; and the cost aggregation is performed on the direct cost volume and the associated cost volume so that the estimated cost of the two input images can be obtained. In an embodiment, the process of cost aggregation may be implemented by a three-dimensional CNN. In this embodiment, the associated cost volume is introduced in the process of determining the estimated cost so that completely associated information is not lost, and the utilization rate of associated information is increased.

It is to be noted that the direct cost volume is calculated according to pixel information in a window of a certain size in a neighborhood of two pixels, and only local information of the first image and the second image is considered. Thus, the cost volume is easily affected by image noise especially when the image is in a weak texture region or a repeated texture region, and the direct cost volume cannot accurately reflect the correlation between pixels, that is, a direct matching cost corresponding to real homonymy points may not be a minimum value. However, in the preceding embodiments, an association between adjacent pixels is established in conjunction with the associated cost volume, and a matrix of underlying feature matching costs is optimized so that the adjacent pixels have consecutive disparity values. Such optimization is global, and an underlying feature matching cost value of each pixel under a certain disparity is updated according to a cost value of an adjacent pixel under the same disparity value or an adjacent disparity value so that all the underlying feature matching cost values can accurately reflect a correlation between real pixels, and a more accurate optimal disparity can be obtained on this basis, thereby improving the accuracy of disparity estimation and stereo matching.

In an embodiment, the number of associated cost information groups is $$\text{group} = \begin{cases} (\text{epoch}+1) \times 4, & \text{group} < \frac{C_{num}}{4} - 1 \\ C_{num}, & \text{group} \geq \frac{C_{num}}{4} - 1 \end{cases},$$

where group denotes the number of associated cost information groups, $C_{num}$ denotes the number of underlying feature matching costs, epoch denotes a current number of iterations, and a maximum value of epoch is equal to the preset number of times.

In this embodiment, for the second network model, a network model parameter epoch is introduced in the grouping process to determine the number of associated cost information groups in each iteration process. For example, the number of underlying feature matching costs of the first image is $C_{num}=200$. In the tenth (epoch=10) iteration process, since $$(10+1) \times 4 < \frac{200}{4} - 1,$$

the underlying feature matching costs of the first image are divided into 44 associated cost information groups. In the twelfth (epoch=12) iteration process, since $$(12+1) \times 4 > \frac{200}{4} - 1,$$

the underlying feature matching costs of the first image are divided into 200 associated cost information groups. The associated cost volume obtained after the preset number of iterations is the associated cost volume of the two input images. It can be seen that at the early stage of the iterations, as the number of iterations increases, the number of associated cost information groups increases and the number of underlying feature matching costs in each associated cost information group decreases continuously, that is, the granularity of matrix optimization is reduced; at the later stage of the iterations, each associated cost information group includes only one underlying feature matching cost, thereby gradually improving the accuracy of the associated cost volume.

In an embodiment, operation 130 includes operations 1310 and 1320.

In operation 1310, the average of the associated cost volume and the direct cost volume is used as the cost volume of the input images.

In operation 1320, the cost aggregation is performed on the cost volume based on the three-dimensional convolutional neural network so that the estimated cost of the input images is obtained.

In this embodiment, the average of the associated cost volume and the direct cost volume is calculated so that the final cost volume is obtained. The associated cost volume is introduced in the process of determining the estimated cost so that the completely associated information is not lost, and the utilization rate of the associated information is increased.

In an embodiment, a disparity corresponding to the first image and the second image is $$\hat{d} = \sum_{d=0}^{D_{max}} d \times \sigma(-c_d),$$

where $\hat{d}$ denotes the estimated disparity, $D_{max}$ denotes a maximum disparity, d denotes the disparity, $\sigma(\square)$ denotes a softmax function, and $c_d$ denotes the estimated cost. $D_{max}$ and d are known quantities in a disparity regression algorithm. On this basis, the accurate estimated disparity can be obtained, thereby improving the accuracy of disparity estimation and stereo matching.

Figure 6:
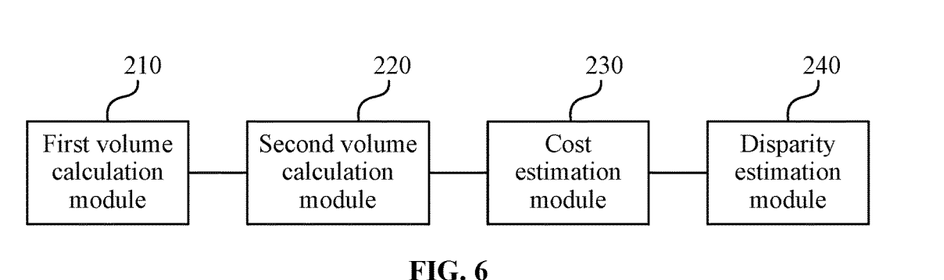
FIG. 6 is a structure diagram of a disparity estimation apparatus according to an embodiment.

An embodiment of the present application further provides a disparity estimation apparatus. FIG. 6 is a structure diagram of a disparity estimation apparatus according to an embodiment. As shown in FIG. 6, the disparity estimation apparatus includes a first volume calculation module 210, a second volume calculation module 220, a cost estimation module 230, and a disparity estimation module 240.

The first volume calculation module 210 is configured to process input images based on a first network model to obtain a direct cost volume of the input images, where the input images include a first image and a second image, and the first network model includes a convolutional neural network, a pyramid convolutional network, and a spatial pyramid pooling layer.

The second volume calculation module 220 is configured to process the input images based on a second network model to obtain an associated cost volume of the input images, where the second network model includes a residual network.

The cost estimation module 230 is configured to determine an estimated cost of the input images according to the associated cost volume and the direct cost volume.

The disparity estimation module 240 is configured to calculate a disparity corresponding to the first image and the second image according to the estimated cost.

According to the disparity estimation apparatus in this embodiment, the pyramid convolutional network is introduced in a process of calculating matching costs so that richer features can be extracted and feature details on different scales can be obtained; moreover, the estimated cost is determined based on the matching costs in conjunction with the associated cost volume constructed according to underlying features so that the features are fully reused, and an association between pixels is considered, thereby improving the accuracy and performance of disparity estimation and stereo matching.

In an embodiment, the first volume calculation module 210 includes a feature extraction unit, a convolution unit, a feature aggregation unit, and a first splicing unit.

The feature extraction unit is configured to extract feature information of the first image and feature information of the second image separately based on the convolutional neural network.

The convolution unit is configured to perform a convolution operation on the feature information of the first image and the feature information of the second image separately based on the pyramid convolutional network to obtain multi-scale feature information of the first image and multi-scale feature information of the second image.

The feature aggregation unit is configured to aggregate the multi-scale feature information of the first image and the multi-scale feature information of the second image separately based on the spatial pyramid pooling layer to obtain matching costs of the first image and matching costs of the second image.

The first splicing unit is configured to splice the matching costs of the first image and the matching costs of the second image to obtain the direct cost volume of the input images.

In an embodiment, the second volume calculation module 220 includes a cost calculation unit, a grouping unit, an update unit, a second splicing unit, and a repetition unit.

The cost calculation unit is configured to acquire underlying feature matching costs of the first image and underlying feature matching costs of the second image separately based on the residual network.

The grouping unit is configured to group the underlying feature matching costs of the first image and the underlying feature matching costs of the second image separately to obtain at least one associated cost information group, where each of the at least one associated cost information group includes at least one underlying feature matching cost.

The update unit is configured to update the at least one underlying feature matching cost in the each of the at least one associated cost information group.

The second splicing unit is configured to splice updated underlying feature matching costs of the first image and updated underlying feature matching costs of the second image to obtain an associated cost volume.

The repetition unit is configured to repeat the above grouping, updating, and splicing operations for a preset number of times and use the obtained associated cost volume as the associated cost volume of the input images.

In an embodiment, the update unit is configured to perform the operations below.

An average of the at least one underlying feature matching cost in the each of the at least one associated cost information group is calculated.

Each of the at least one underlying feature matching cost in the each of the at least one associated cost information group is replaced with the average of the at least one underlying feature matching cost in the each of the at least one associated cost information group.

In an embodiment, the number of associated cost information groups is $$\text{group} = \begin{cases} (\text{epoch}+1) \times 4, & \text{group} < \dfrac{C_{num}}{4} - 1 \\ C_{num}, & \text{group} \geq \dfrac{C_{num}}{4} - 1 \end{cases},$$

where group denotes the number of associated cost information groups, $C_{num}$ denotes the number of underlying feature matching costs, epoch denotes a current number of iterations, and a maximum value of epoch is equal to the preset number of times.

In an embodiment, the cost estimation module 230 includes a cost volume calculation unit and a cost volume aggregation unit.

The cost volume calculation unit is configured to use an average of the associated cost volume and the direct cost volume as a cost volume of the input images.

The cost volume aggregation unit is configured to perform cost aggregation on the cost volume based on a three-dimensional convolutional neural network to obtain the estimated cost of the input images.

In an embodiment, a disparity corresponding to the first image and the second image is $$\hat{d} = \sum_{d=0}^{D_{max}} d \times \sigma(-c_d),$$

where d̂ denotes the estimated disparity, $D_{max}$ denotes a maximum disparity, d denotes the disparity, σ(□) denotes a softmax function, and $c_d$ denotes the estimated cost.

The disparity estimation apparatus provided in this embodiment and the disparity estimation method provided in the preceding embodiments belong to the same inventive concept. For technical details not described in detail in this embodiment, reference may be made to any one of the preceding embodiments. This embodiment has the same beneficial effects as the performed disparity estimation method.

Figure 7:
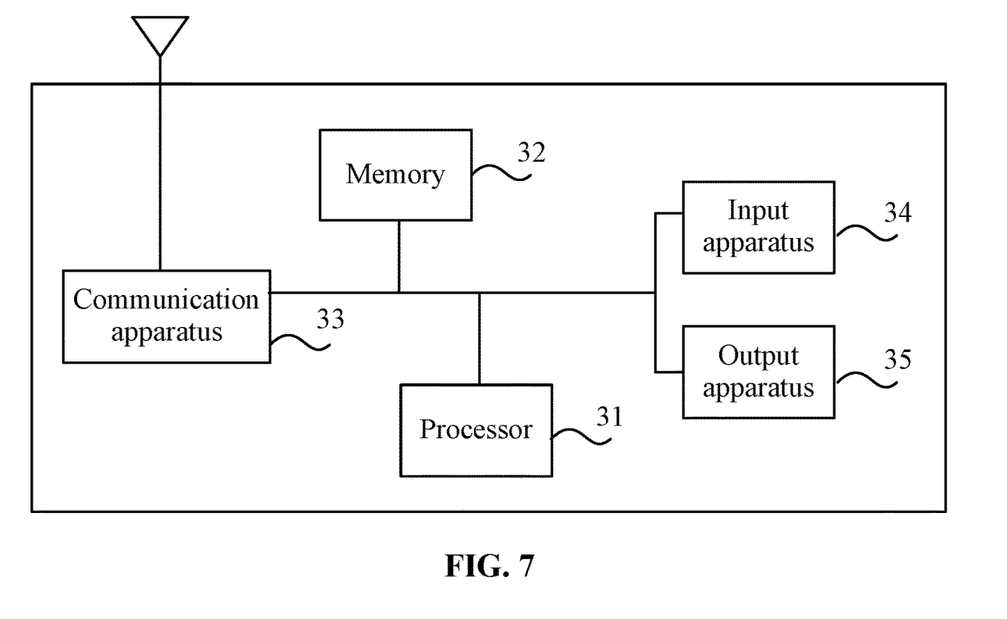
FIG. 7 is a structure diagram of hardware of an image processing device according to an embodiment.

An embodiment of the present application further provides an image processing device. FIG. 7 is a structure diagram of hardware of an image processing device according to an embodiment. As shown in FIG. 7, the image processing device provided by the present application includes a memory 32, a processor 31, and a computer program stored on the memory and executable by the processor, where the processor 31, when executing the program, performs the preceding disparity estimation method.

The image processing device may further include the memory 32. One or more processors 31 may be provided in the image processing device, and one processor 31 is shown as an example in FIG. 7. The memory 32 is configured to store one or more programs, where the one or more programs, when executed by the one or more processors 31, cause the one or more processors 31 to perform the disparity estimation method in the embodiments of the present application.

The image processing device further includes a communication apparatus 33, an input apparatus 34, and an output apparatus 35.

The processor 31, the memory 32, the communication apparatus 33, the input apparatus 34, and the output apparatus 35 in the image processing device may be connected via a bus or in other manners. The connection via a bus is shown as an example in FIG. 7.

The input apparatus 34 may be configured to receive inputted digital or character information and generate key signal input related to user settings and function control of the image processing device. The output apparatus 35 may include a display device such as a display screen.

The communication apparatus 33 may include a receiver and a sender. The communication apparatus 33 is configured to perform information transceiving communication under the control of the processor 31.

As a computer-readable storage medium, the memory 32 may be configured to store software programs, computer-executable programs, and modules, such as program instructions/modules corresponding to the disparity estimation method in the embodiments of the present application (for example, the first volume calculation module 210, the second volume calculation module 220, the cost estimation module 230, and the disparity estimation module 240 in the disparity estimation apparatus). The memory 32 may include a program storage region and a data storage region, where the program storage region may store an operating system and an application program required by at least one function, and the data storage region may store data and the like created according to the use of the image processing device. Additionally, the memory 32 may include a high-speed random-access memory and may also include a non-volatile memory, such as at least one magnetic disk memory, a flash memory, or another nonvolatile solid-state memory. In some examples, the memory 32 may further include memories which are remotely disposed relative to the processor 31, and these remote memories may be connected to the image processing device via a network. Examples of the preceding network include, but are not limited to, the Internet, an intranet, a local area network, a mobile communication network, and a combination thereof.

An embodiment of the present application further provides a storage medium. The storage medium stores a computer program which, when executed by a processor, causes the processor to perform the disparity estimation method according to any one of the embodiments of the present application. The method includes: processing input images based on a first network model to obtain a direct cost volume of the input images, where the input images include a first image and a second image, and the first network model includes a convolutional neural network, a pyramid convolutional network, and a spatial pyramid pooling layer; processing the input images based on a second network model to obtain an associated cost volume of the input images, where the second network model includes a residual network; determining an estimated cost of the input images according to the associated cost volume and the direct cost volume; and calculating an estimated disparity corresponding to the first image and the second image according to the estimated cost.

A computer storage medium in an embodiment of the present application may adopt any combination of one or more computer-readable media. The computer-readable media may be computer-readable signal media or computer-readable storage media. For example, a computer-readable storage medium may be, but is not limited to, an electrical, magnetic, optical, electromagnetic, infrared, or semiconductor system, apparatus, or device or any combination thereof. Examples of the computer-readable storage medium (a non-exhaustive list) include an electrical connection having one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical memory, a magnetic memory, or any suitable combination thereof. The computer-readable storage medium may be any tangible medium including or storing a program. The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

Program codes included on the computer-readable medium may be transmitted by any suitable medium including, but not limited to, a wireless medium, a wire, an optical cable, a radio frequency (RF), or any suitable combination thereof.

Computer program codes for performing operations of the present application may be written in one or more programming languages or a combination thereof. The programming languages include object-oriented programming languages such as Java, Smalltalk, and C++ and further include conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network including a local area network (LAN) or a wide area network (WAN), or may be connected to an external computer (for example, via the Internet provided by an Internet service provider).

The preceding are only example embodiments of the present application and are not intended to limit the scope of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored on a memory. The memory may be of any type suitable for a local technical environment and may be implemented using any suitable data storage technology, such as, but not limited to, a ROM, a RAM, or an optical memory device and system (for example, a digital video disc (DVD) or a compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A disparity estimation method, comprising:
    processing input images based on a first network model to obtain a direct cost volume of the input images, wherein the input images comprise a first image and a second image, and the first network model comprises a convolutional neural network, a pyramid convolutional network, and a spatial pyramid pooling layer;
    processing the input images based on a second network model to obtain an associated cost volume of the input images, wherein the second network model comprises a residual network;
    determining an estimated cost of the input images according to the associated cost volume and the direct cost volume; and
    Calculating an estimated disparity corresponding to the first image and the second image according to the estimated cost.

2. The method of claim 1, wherein processing the input images based on the first network model to obtain the direct cost volume of the input images comprises:
    extracting feature information of the first image and feature information of the second image separately based on the convolutional neural network;
    performing a convolution operation on the feature information of the first image and the feature information of the second image separately based on the pyramid convolutional network to obtain multi-scale feature information of the first image and multi-scale feature information of the second image;
    aggregating the multi-scale feature information of the first image and the multi-scale feature information of the second image separately based on the spatial pyramid pooling layer to obtain matching costs of the first image and matching costs of the second image; and
    splicing the matching costs of the first image and the matching costs of the second image to obtain the direct cost volume of the input images.

3. The method of claim 1, wherein processing the input images based on the second network model to obtain the associated cost volume of the input images comprises:
    acquiring underlying feature matching costs of the first image and underlying feature matching costs of the second image separately based on the residual network;
    grouping the underlying feature matching costs of the first image and the underlying feature matching costs of the second image separately to obtain at least one associated cost information group, wherein each of the at least one associated cost information group comprises at least one underlying feature matching cost;
    updating the at least one underlying feature matching cost in the each of the at least one associated cost information group;
    splicing updated underlying feature matching costs of the first image and updated underlying feature matching costs of the second image to obtain an associated cost volume; and
    repeating the above grouping, updating, and splicing operations for a preset number of times, and using the obtained associated cost volume as the associated cost volume of the input images.

4. The method of claim 3, wherein updating the at least one underlying feature matching cost in the each of the at least one associated cost information group comprises:
    calculating an average of the at least one underlying feature matching cost in the each of the at least one associated cost information group; and
    replacing each of the at least one underlying feature matching cost in the each of the at least one associated cost information group with the average of the at least one underlying feature matching cost in the each of the at least one associated cost information group.

5. The method of claim 3, wherein a number of associated cost information groups is $$group = \begin{cases} (epoch+1) \times 4, & group < \frac{C_{num}}{4} - 1 \\ C_{num}, & group \geq \frac{C_{num}}{4} - 1 \end{cases},$$

wherein group denotes the number of associated cost information groups, $C_{num}$ denotes a number of underlying feature matching costs, epoch denotes a current number of iterations, and a maximum value of epoch is equal to the preset number of times.

6. The method of claim 1, wherein determining the estimated cost of the input images according to the associated cost volume and the direct cost volume comprises:
   using an average of the associated cost volume and the direct cost volume as a cost volume of the input images; and
   performing cost aggregation on the cost volume based on a three-dimensional convolutional neural network to obtain the estimated cost of the input images.

7. The method of claim 1, wherein a disparity corresponding to the first image and the second image is $$\hat{d} = \sum_{d=0}^{D_{max}} d \times \sigma(-c_d),$$

wherein $\hat{d}$ denotes the estimated disparity, $D_{max}$ denotes a maximum disparity, d denotes the disparity, $\sigma(\bullet)$ denotes a softmax function, and $c_d$ denotes the estimated cost.

8. An image processing device, comprising a memory, a processor, and a computer program stored on the memory and executable by the processor, wherein the processor, when executing the computer program, performs the disparity estimation method of claim 1.

9. A non-transitory computer-readable storage medium, which is configured to store a computer program which, when executed by a processor, causes the processor to perform the disparity estimation method of claim 1.

* * * * *